Jan. 8, 1935.   L. BACK   1,987,385
CHILD'S VEHICLE
Filed Aug. 12, 1932   2 Sheets-Sheet 1
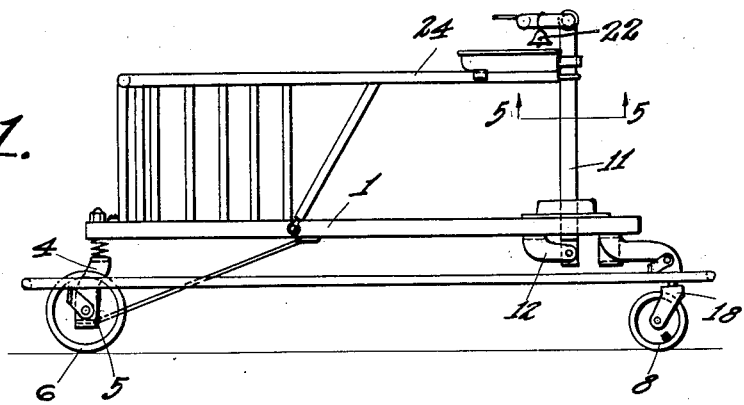
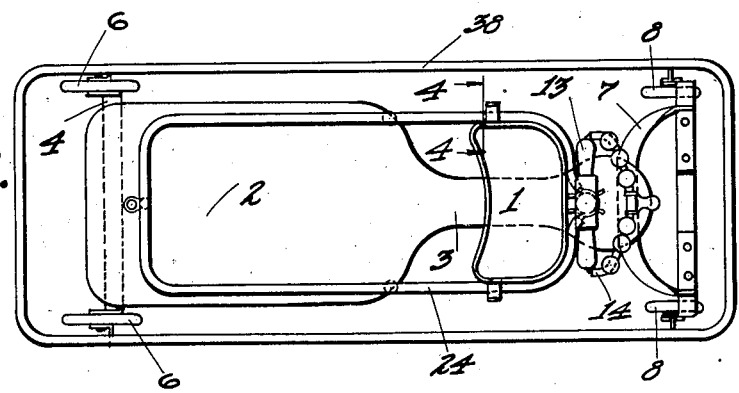
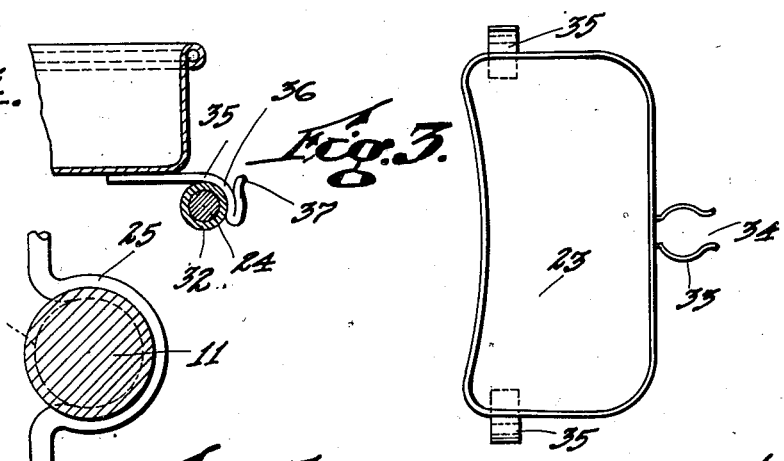
Inventor:
Leonard Back
By Charles A. Warren
Attorney Jan. 8, 1935.  L. BACK  1,987,385

CHILD'S VEHICLE

Filed Aug. 12, 1932  2 Sheets-Sheet 2

Inventor:
Leonard Back
By Charles A. Warren
Attorney

Patented Jan. 8, 1935

1,987,385

UNITED STATES PATENT OFFICE 1,987,385

CHILD'S VEHICLE

Leonard Back, Fitchburg, Mass., assignor to Iver Johnson's Arms & Cycle Works, Fitchburg, Mass., a corporation of Massachusetts Application August 12, 1932, Serial No. 628,465

2 Claims. (Cl. 155—22)

The present invention relates to a child's vehicle and particularly to that class of vehicles known as baby walkers or strollers, vehicles of this type being usually provided with a steering post and handle at the front end and an enclosing ring supported above the seat to prevent the child from falling out of the vehicle.

The principal features of the present invention reside in providing a quickly detachable play tray which will support toys and other articles for the child and also a detachable play ring which is mounted for movement into and out of operative position, said ring extending over the play tray in operative position. Other features of the invention are found in the novel supporting back and mounting therefor as well as the bumper construction by which the child in the vehicle is completely protected from bumping against furniture and walls of the room.

The objects and other features of the invention will more fully appear from the following detailed description, taken in connection with the accompanying drawings, in which:—

Fig. 1 is a side elevation of a vehicle embodying the invention.

Fig. 2 is a plan view of the device.

Fig. 3 is a plan view of the play tray removed from the vehicle.

Fig. 4 is a fragmentary section along the line 4—4 of Fig. 2 showing the manner in which the play tray is secured to the supporting ring.

Fig. 5 is a vertical section along the line 5—5 of Fig. 1, looking in the direction of the arrows, to show the manner in which the supporting ring is secured to the steering post.

Like reference characters refer to like parts in the different figures.

Figures 6, 7:
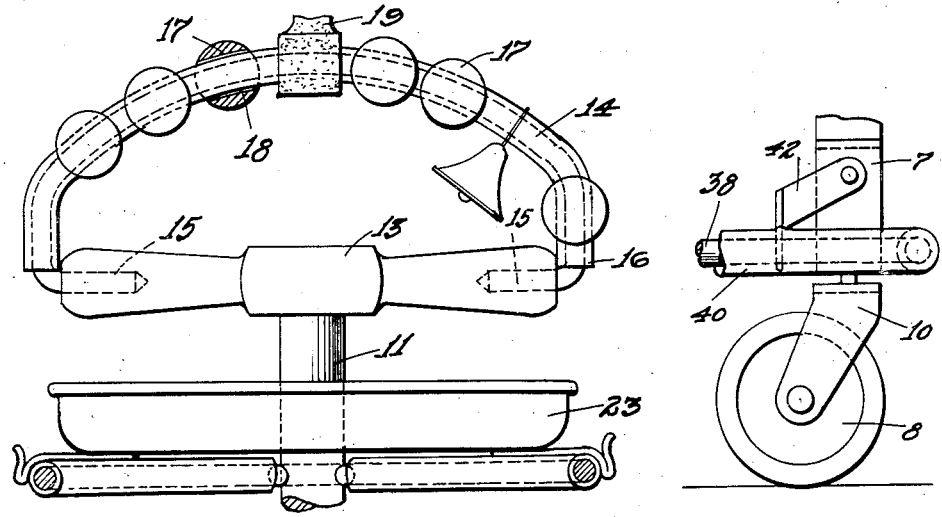
Fig. 6 is an enlarged fragmentary elevation of the upper end of the steering post with the associated parts.
Fig. 7 is an enlarged fragmentary elevation of one of the front wheels of the vehicle showing the manner in which the bumper is supported.

Referring first to Figs. 1 and 2, the vehicle comprises a seat board 1, the rearward portion 2 of which is relatively wide for the child to sit on and the forward end 3 is relatively narrow to provide a straddle portion, the child's legs extending down on opposite sides thereof as will be apparent. The seat board 1 is supported at the rear by a frame work 4 which provides a bearing for the rear axle 5 on which the spaced rear wheels 6 are mounted, and the forward end of the seat board is supported by a frame work 7 on which are mounted the front wheels 8, the latter being carried by casters 10, swivelled on the frame to provide for turning of the carriage. A post 11 extends vertically upward from the forward end of the seat board 1 and is normally held against rotation by a bracket 12 beneath the seat, and the upper end of said post 11 has a cross bar or handle 13. The lower end of the post 11 is arranged to carry a fifth or steering wheel, not shown, in the manner fully described in the Mayer Patent No. 1,644,535, granted October 4, 1927, to provide for steering of the vehicle by the child when desired, the bracket 12 being dispensed with when the fifth wheel is positioned on the vehicle.

According to the invention, a play ring 14 is mounted on the cross bar 13 for movement into and out of operative position. Referring especially to Fig. 6, the opposite ends of the cross bar 13 are recessed to receive the inwardly bent ends 15 of the play ring which, as seen in this figure is substantially semi-circular or semi-elliptic, the ends 15 providing a pivotal support for said ring. The ring which consists of a wire member has substantially its entire exposed portion covered by rubber tubing 16 on which a plurality of colored balls 17 or the like are slidably positioned, the latter having bores 18 therethrough slightly larger in diameter than the tubing 16. A rubber teething member 19 is mounted substantially centrally of the play ring and has an opening through one end thereof through which the wire ring 14 extends so that said member 19 is pivotally mounted on said ring. The construction shown provides a separate section of rubber tubing from the member 19 to each end of said wire member. A bell 22 or other amusing toy may also be suitably mounted on the play ring. As best shown in Fig. 1, the ring may be pivoted from a position directly above the play tray 23, in which position the child may readily reach the play ring and in which position said ring also provides an extension for the handle 13 so that a small child who cannot reach the cross piece 13 may still have a substantially rigid member by which to support himself while using the vehicle. When the child wishes to use the play tray instead of the ring, it will be apparent that the latter may be readily swung into the position shown in Fig. 2 to remove said ring from operative position without detaching said ring from the cross piece. It will also be noted that said ring is removable as a unit from the cross bar, the resiliency of the wire 14 permitting the ends 15 of said wire to be withdrawn from the openings in the opposite ends of the cross bar and to be easily reinserted therein.

In order to prevent the child from falling off of or out of the vehicle, a supporting ring 24 substantially rectangular in shape, as shown in Fig. 2, is mounted above and in spaced parallel relation to the seat board. The forward end of said ring which is supported by the post 11 has an open loop 25 therein, Fig. 5, for engagement in a circular groove 26 in the steering post so that said ring will be supported against vertical movement on said post without interfering with rotation of said post. The open loop construction also provides for easy removal of the ring from the post when desired by spreading the opposite sides of the supporting ring.

Figure 8:
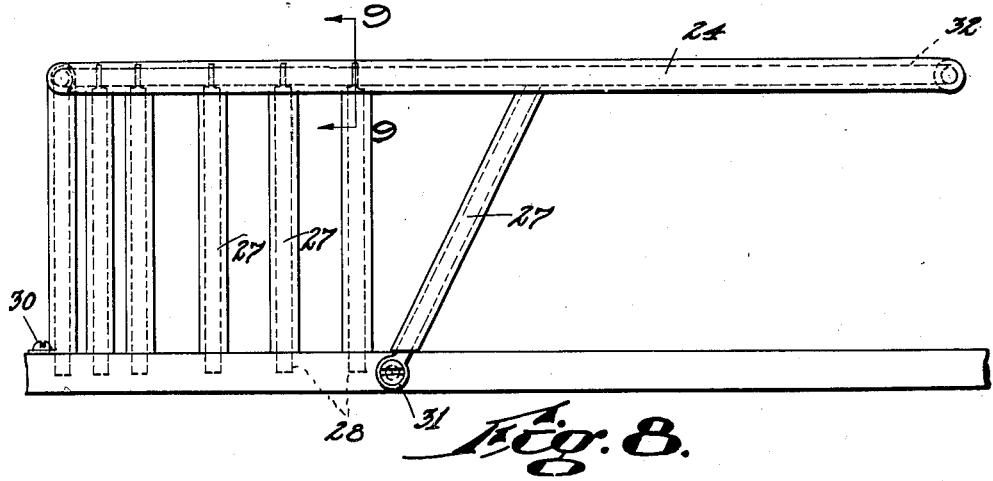
Fig. 8 is an enlarged elevation with parts in section showing the back structure and the manner in which it is associated with the seat and the supporting ring.
Figures 9, 10:
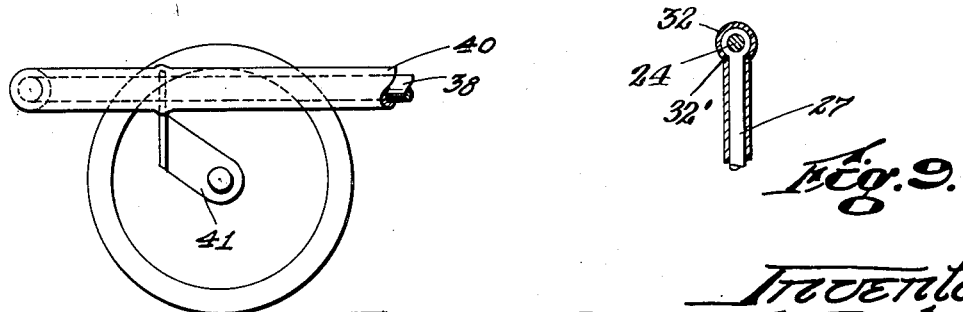
Fig. 9 is a section along the line 9—9 of Fig. 8 showing the manner in which the vertical supports for the back are secured to the supporting ring.
Fig. 10 is a view, corresponding to Fig. 7, of one of the rear wheels showing the manner in which the bumper is supported at the rear.

The rearward end of the ring is supported by the back rest and the separate elements of said back rest are maintained in spaced relation to each other by said ring. Referring particularly to Fig. 8 which shows the back rest in an enlarged view, a plurality of wire members 27 have their upper end flattened and an opening provided therethrough for the reception of the ring 24 and the lower ends thereof extend into openings 28 in the seat board 1. The members 27, which form the back rest, are held in the seat board by the central or middle member 27, the lower end of which, instead of projecting into the seat board, as in the case with the other members 27, is bent outwardly at right angles to said member and has its outwardly projecting end flattened to receive a screw 30 which extends through said end and into the seat board. The forward members 27 on either side of the seat board, instead of projecting into said board, extend downwardly at the sides of said board and the ends thereof are flattened to receive screws 31, thereby further preventing removal of said ring and back rest from the seat board. The ring 24 is covered, except for the loop 25, by a continuous strip of rubber tubing 32 which is provided with slits 32', as best shown in Fig. 9, to receive the ends of the members 27, said tubing supporting said members 27 in proper spaced relation and also covering the ends of said members 27 to prevent contact between said members and the child's body when he is in the vehicle. The members 27 are also rubber covered, as shown, to provide in combination with the rubber covered supporting ring an entirely rubber covered back rest which, by reason of the spacing of the members 27, provides thorough ventilation for the back of the child.

The play tray 23, above mentioned, is secured to the steering post 11 and the supporting ring 24 and is readily removable therefrom. The play tray which is substantially rectangular in plan, as shown in Fig. 3, has a U-shaped clip 33 which is arranged to engage about the post 11, said clip having an opening 34 to receive the post to permit attachment of the tray. In addition to the clip 33 which is located centrally of the forward edge of the tray, the rearward edge of the tray is provided at opposite ends with clips 35 which, as shown in Figs. 4 and 6, extend outwardly beyond the edge of the tray and have a downwardly curved portion 36 for engagement over the outer edges of the confining ring 24, the ends of said clips being bent upwardly as at 37 to provide means by which the clips may be removed from engagement with the ring 24. This structure permits easy removal of the tray, when desired, or replacement of the tray on the vehicle without interfering with the remainder of the structure. It will be apparent that the play tray and play ring are arranged to be used either in combination or separately, either of said members being removable at will. Removal of the tray will provide more room for the child when he is straddling the forward portion of the seat and attempting to walk, and at the same time the play ring will provide a convenient handle by which the child may support himself in a position for walking.

The invention also includes a novel bumper which entirely surrounds the vehicle and extends therebeyond on all sides of the vehicle and which prevents the child in the vehicle from coming in contact with and being injured by furniture or the walls of the room. Referring first to Fig. 2, it will be noted that the bumper 38 is substantially rectangular, and is sufficiently long and wide to extend beyond the sides of the carriage in all directions. The bumper is entirely covered by rubber tubing 40, Figs. 7 and 10, to avoid damage to or marring of articles with which the vehicle comes in contact. A clip 41 is secured to each end of the rear axle 5 beyond the wheels 6 and a portion of said clip has an opening therethrough for the reception of the wire 38 forming the bumper. It will be noted that the rubber covering 40 for the member 38 is provided with a slit to receive the clip 41 and to cover the outer edge thereof to provide for complete covering of the bumper by the rubber. The frame 7 at the front of the seat has a clip 42 at each end thereof similar to the clip 41, said clip 42 being secured to the bumper 38 in the manner above described with reference to the clip 41. The arrangement is preferably such that the bumper 38 is substantially horizontal, in a plane parallel to the seat board 1.

From the foregoing it will be apparent that the invention provides a vehicle which protects the child therein against bumping by reason of the arrangement of the novel bumper and which also prevents the child's body from coming in contact with exposed metal surfaces on the carriage by reason of the rubber covered supporting ring and back rest. The child is also provided with a play tray and a play ring by which to amuse himself in the vehicle, either of said members (the tray or the ring), as above pointed out, being removable separately from the other as desired.

I claim:

1. In a child's vehicle, the combination with a seat having an enlarged rear portion and a reduced forward portion, supporting frames connected to said seat, a confining ring spaced above said seat and a vertical post extending upwardly from the forward portion of said seat, of a tray, and means by which said tray is removably secured to said confining ring and post.

2. In a child's vehicle, the combination with a seat having an enlarged rear portion and a reduced forward portion, supporting frames connected to said seat, a confining ring spaced above said seat and a vertical post extending upwardly from the forward portion of said seat, of a tray adapted to be removably secured to said confining ring and post, said tray having clips extending over opposite sides of said confining ring and a clip adjacent the forward end thereof engaging the vertical post.

LEONARD BACK.